United States Patent
Carter et al.

(10) Patent No.: US 8,392,965 B2
(45) Date of Patent: Mar. 5, 2013

(54) MULTIPLE BIOMETRIC SMART CARD AUTHENTICATION

(75) Inventors: Stephen R Carter, Spanish Fork, UT (US); Tammy A. Green, Provo, UT (US)

(73) Assignee: Oracle International Corporation, Redwood Shores, CA (US)

(*) Notice: Subject to any disclaimer, the term of this patent is extended or adjusted under 35 U.S.C. 154(b) by 1206 days.

(21) Appl. No.: 12/210,960

(22) Filed: Sep. 15, 2008

(65) Prior Publication Data

US 2010/0071031 A1    Mar. 18, 2010

(51) Int. Cl.
*G06F 17/30*    (2006.01)

(52) U.S. Cl. ............... 726/2; 726/16; 726/19; 726/20; 382/115; 382/116

(58) Field of Classification Search ............. 726/2, 16, 726/19, 20; 382/115, 116
See application file for complete search history.

(56) References Cited

U.S. PATENT DOCUMENTS

| | | | |
|---|---|---|---|
| 5,719,950 A * | 2/1998 | Osten et al. .................. 382/115 |
| 6,219,439 B1 * | 4/2001 | Burger ........................ 382/115 |
| 6,360,953 B1 * | 3/2002 | Lin et al. ..................... 235/492 |
| 6,728,881 B1 * | 4/2004 | Karamchetty ............... 713/186 |
| 7,086,085 B1 * | 8/2006 | Brown et al. ................... 726/7 |
| 7,181,626 B1 | 2/2007 | Rasmussen |
| 7,232,073 B1 | 6/2007 | Jong |
| 7,260,726 B1 * | 8/2007 | Doe et al. .................... 713/189 |
| 7,376,839 B2 | 5/2008 | Carta et al. |
| 2005/0139656 A1 * | 6/2005 | Arnouse ...................... 235/382 |
| 2006/0294390 A1 * | 12/2006 | Navratil et al. ............. 713/182 |
| 2007/0228154 A1 | 10/2007 | Tran |
| 2008/0164325 A1 | 7/2008 | Borracci |
| 2008/0172750 A1 * | 7/2008 | Keithley et al. ............... 726/28 |

OTHER PUBLICATIONS

"Alliance Activities : Publications : Smart Cards Biometrics Report—Smart Card Alliance", http://www.smartcardalliance.org/pages/publications-smart-card-biometric-report, (May, 2002).
"Fingerprint Scanner in Biometric Smart Card Reader", Copyright 1999-2008 Jacquinot Consulting, Inc. <http://www.jacquinot.com>, (Mar. 1, 2008).

* cited by examiner

*Primary Examiner* — Harunur Rashid
(74) *Attorney, Agent, or Firm* — Kilpatrick Townsend & Stockton LLP

(57) ABSTRACT

Techniques for multiple biometric smart card authentication are provided. At least two biometric readings are obtained from a requesting user. Both biometric readings are verified before access to resources of a smart card are made available to the requesting user.

14 Claims, 3 Drawing Sheets

MULTIPLE BIOMETRIC SMART CARD AUTHENTICATION

BACKGROUND

Increasingly enterprises and governments are relying on smart cards to provide identity authentication of individuals, information, devices, and/or assets. Smart cards can house and in some cases process security information that can be used for securely validating the identity of individuals, financial accounts, assets, etc.

In fact, some governments (e.g., Spain, Malaysia, and Belgium) are now issuing smart cards to their citizens for purposes of validating the identity of their citizens and providing useful history information about their citizens. Many states in the United States and many foreign governments now issue drivers' licenses in the form of smart cards, which include a variety of information about the drivers, such as blood type, medical conditions, prior driving record, photograph of the driver, physical characteristics of the driver, etc. Smart cards are also used to conduct business transactions and securely activate other devices or assets, such as accessing bank accounts, activating a lock to a safety deposit box, and the like.

Many individuals most commonly recognize the use of "smart cards" with respect to their mobile phones via their Subscriber Identity Module (SIM) cards, which are installed in their mobile phones. A SIM card uniquely permits a particular phone and phone number to be recognized over a mobile phone network and associated with a particular user. In fact, a user can switch phones by removing his/her individual SIM card from one phone and installing it in another phone. The SIM card not only activates the phone for network use but also provides a mechanism for the user to store and retrieve other useful information, such as contact information, profile information, and the like.

Some forms of smart cards require little to no security at all, such that a possessor of the smart card can utilize the information housed on that card. This occurs with credit cards that are forms of read only smart cards or SIM cards that are not password protected. Yet, most smart cards today require some form of activation to access the confidential information included on the smart cards, such as a password or a secret. However, for smart cards that provide vital authentication information and/or access to important governmental or enterprise assets, a straight forward password authentication technique that activates the smart cards for use may be too lenient and too easily compromised by intruders.

Accordingly, improved techniques for smart card authentication are desirable.

SUMMARY

In various embodiments, techniques for multiple biometric smart card authentication are presented. More specifically, and in an embodiment, a method for biometric smart card authentication is provided. A first biometric reading and a second biometric reading are received. Next, a determination is made as to whether to grant access to a smart card in response to evaluating the first and second biometric readings.

DETAILED DESCRIPTION

Figure 1:
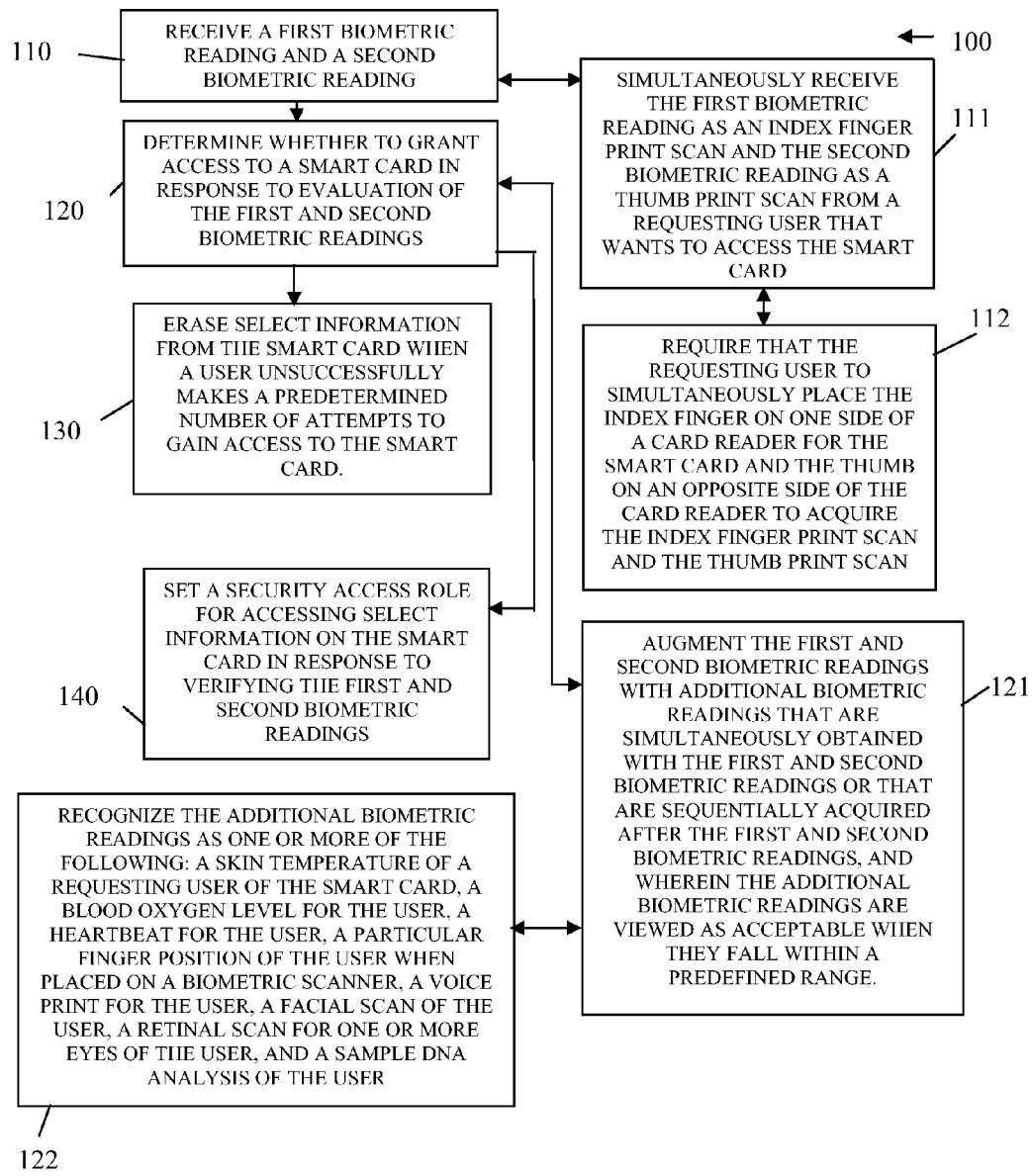
FIG. 1 is a diagram of a method for biometric smart card authentication, according to an example embodiment.

A "resource" includes a service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers, secrets, and/or attributes that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger. In an embodiment, the identifier is a signature or a pair of signatures. For example, the signature of an identity service that vouches for a crafted identity, the signature of a principal associated with the crafted identity, or the signature of both the identity service and the principal.

"Authentication" is the process of validating the association of identifiers and secrets according to a policy, which is specific to the context in which the resulting identity is to be used. Thus, when identifiers are validated within a context specific to how an identity is to be used, it is authentication.

A "crafted identity" is an identity that may permit a principal's true identity to remain anonymous from the resource it seeks to access. With a crafted identity, an identity vault (e.g., one or more repositories holding secrets and identifiers) is opened to create the crafted identity and authenticate the principal to which it is associated, and then the identity vault is closed. Thereafter, the crafted identity can be validated by a resource, and acted upon without ever re-referencing the identity vault.

Example creation, maintenance, and use of crafted identities are discussed in U.S. patent Ser. No. 11/225,993 ("Crafted Identities"); commonly assigned to Novell, Inc. of Provo, Utah and the disclosure of which is incorporated by reference herein.

In some embodiments, an identity service is used. Examples of an identity service can be found in: U.S. patent Ser. Nos. 10/765,523 ("Techniques for Dynamically Establishing and Managing Authentication and Trust Relationships"), 10/767,884 ("Techniques for Establishing and Managing a Distributed Credential Store"), and 10/770,677 ("Techniques for Dynamically Establishing and Managing Trust Relationships"). These applications are also commonly assigned to Novell, Inc. of Provo, Utah and the disclosures of which are incorporated by reference herein.

A "smart card" refers to a self contained portable device that supplies security services to a resource, such as a user or an automated service that the user desires to access. So, a smart card is an integrated circuit card (ICC) that can be pocket sized or even smaller and which can process information. The smart card is used for authentication of an identity and can receive input information that it processes to authenticate that identity. Moreover, the smart card can include security services, such as encryption, digital certificate validation, digital signature verification, security key generation, etc. for an authenticated identity. The smart card can be integrated within a variety of other media or structures, such as a credit card, a memory stick, a button worn by a person, integrated within clothing material, etc.

It is noted that the actions and techniques presented herein assume that a requesting user has turned on the smart card or that the smart card has activated its power in some manner before taking the actions presented herein. Obviously, this conserves power if the smart card is equipped with its own power mechanism. However, this does not always have to be the case because the smart card may be equipped with a solar battery, such that is always on and regularly recharges itself to ensure proper power. It may also be configured to turn itself on automatically when touched in a certain locations, such as a biometric reader (as discussed more completely herein). Still further, power can be acquired from other devices that the smart card connects to. So, in some instances the user takes affirmative actions to power up the smart card and in other cases power is managed and on when the user attempts to use the smart card based on the manner of use or devices being used in connection with the smart card. The point is that the power mechanism can be achieved in a variety of manners and the remainder of the discussion herein assumes that one or more of those mechanisms have been activated to achieve the various processing scenarios discussed herein and below.

Another pre-action that takes place is initial configuration of the smart card with a user's biometrics, keys, etc. Other lifecycle actions on the smart card, such as updates can be achieved via an administrative interface integrated into the smart card. Updates can be to the entire smart card contents or to just a portion and achieved via the administrative interface. A recycling process (post lifecycle from the perspective of a particular user) can also be used to recycle the smart cards for new users, such as when a user is an employee that leaves an enterprise to which the employee is employed. The administrative interface can be activated on the smart card via administrator biometric authentication for one or more administrators in the same novel manners discussed below with respect to a user that attempts to authenticate and access the smart card.

Various embodiments of this invention can be implemented as enhancements to existing smart cards or enhancement to existing smart card readers/scanners. As will be explained more completely herein and below some embodiments include a combination dual biometric scanner that encases a smart card as a single integrated device or system (discussed below within the context of the FIG. 3 and the system 300).

Of course, the embodiments of the invention can be implemented in a variety of architectural platforms, operating and server systems, devices or applications. Any particular architectural layout or implementation presented herein is provided for purposes of illustration and comprehension only and is not intended to limit aspects of the invention.

It is within this context that embodiments of the invention are now discussed with reference to the FIGS. 1-4.

FIG. 1 is a diagram of a method 100 for biometric smart card authentication, according to an example embodiment. The method 100 (hereinafter "smart card authentication service") is implemented in a machine-accessible and readable medium. The smart card authentication service processes on and within a smart card and/or a smart card reader/scanner.

At 110, the smart card authentication service receives a first biometric reading and a second biometric reading. Thus, at least two and in some cases more than two biometric readings are obtained from a requesting user. The readings are provided as measurements or metrics for physical characteristics of the requesting user. A variety of biometric scanners can be used to obtain the readings; some of these are discussed below within the context of the embodiment at 122.

According to an embodiment, at 111, the smart card authentication service simultaneously receives the first biometric reading as a finger print scan (such as an index finger) or measurement and the second biometric reading as a thumb print scan or reading. These two readings are received simultaneously and together from a requesting user that desires to access a smart card having desired security services.

In a particular situation, at 112, the smart card authentication service requires that the readings be obtained or received from a requesting user that simultaneously places the index finger on one side of a biometric card reader/scanner for the smart card and the thumb on an opposite side of the card reader/scanner for purposes of acquiring the index finger print scan and the thumb print scan as the first and second biometric readings, respectively.

Once the first and second (multiple biometric readings/measurements) are acquired from a requesting user, and at 120, the smart card authentication service determines whether to grant access to a smart card in response to evaluation of the first and second biometric readings. This can be achieved by evaluating the readings to ensure that they are within a configured tolerance and then comparing to templates for a match.

So, the smart card is configured with a template for matching a valid requesting user's first and second biometric readings/measurements. The smart card authentication service processes on the smart card when a requesting user inserts it into a card reader of a device or places it within a wireless communication range of a device that detects the smart card and attempts to activate it. The requesting user then supplies two or more biometric readings/measurements taken via a biometric scanner, such as a finger print scanner. Those two or more measurements are then compared against the configured template for what the smart card authentication service expects to see and a policy can be evaluated to determine if the comparison is sufficient enough to warrant access to resources of the smart card.

According to an embodiment, at 121, the smart card authentication service augments the first and second biometric readings with additional biometric readings that can be simultaneously obtained with the first and second biometric readings. Alternatively, the additional biometric readings can be obtained sequentially after the first and second biometric readings are acquired. These additional biometric readings are then viewed as acceptable if they fall within a predefined range of values defined via policy or thresholds within the smart card.

In some cases, at 122, the smart card authentication service recognizes the additional biometric readings as one or more of the following: a skin temperature of the requesting user of the smart card, a blood oxygen level for the requesting user, a heartbeat rate for the requesting user, a particular finger position of the requesting user when placed on a biometric scanner, a voice print for the requesting user, a facial scan of the requesting user, a retinal scan for one or more eyes of the requesting user, sample DNA analysis of the requesting user, etc.

So, validation for access to the smart card can be achieved via the processing of two simultaneous finger print readings of a requesting user (or other biometric measurements) and then access can be rejected in response to additional biometric information obtained with those initial readings, such as an excessive heart rate of the requesting user, which may indicate that the requesting user is under duress when attempting to access the smart card.

In an embodiment, at 130, the smart card authentication service erases select information from the smart card when a requesting user unsuccessfully makes a predetermined number of attempts to gain access to the smart card. So, as an example, if the smart card falls into the wrong hands and the possessor attempts to authenticate more than three times, the smart card authentication service processing on the smart card and can proactively erase select confidential information or resources or the entire contents of the smart card. In fact, the smart card authentication service can erase itself, this can be done by activating a format memory or disk operation on the smart card, which will terminate the smart card authentication service and erase the entire memory and disk contents of the smart card.

In yet another situation, the smart card authentication service can maintain a log and shut down all authentication services pending some supervisory authentication. Once a supervisor with proper authentication brings up the smart card authentication service, the log can be viewed and any action taken accordingly. In other cases, the log can be communicated to a defined resource via a network when the smart card detects the presence of a network connection that it can use to communicate the log.

In another case, at 140, the smart card authentication service sets a security access role for accessing select information on the smart card in response to verifying the first and second biometric readings. So, rather than giving access to the entire contents and resources of the smart card upon authentication, the smart card authentication service can selectively set access roles and permissions to the resources based on who is authenticating and the level of confidence associated with the type of biometric reading supplied.

For example, a DNA reading warrants stronger authentication than a finger print reading; so, successful DNA analysis may trigger assigning an access role that grants access to all resources on the smart card. It may also be that the smart card is shared between users, such as a family, so different users of the family have access to different information and resources available on the same smart card. For example, the father and mother may have full access to financial verification services whereas the children are given no access to these services but access to home verification services.

Figure 2:
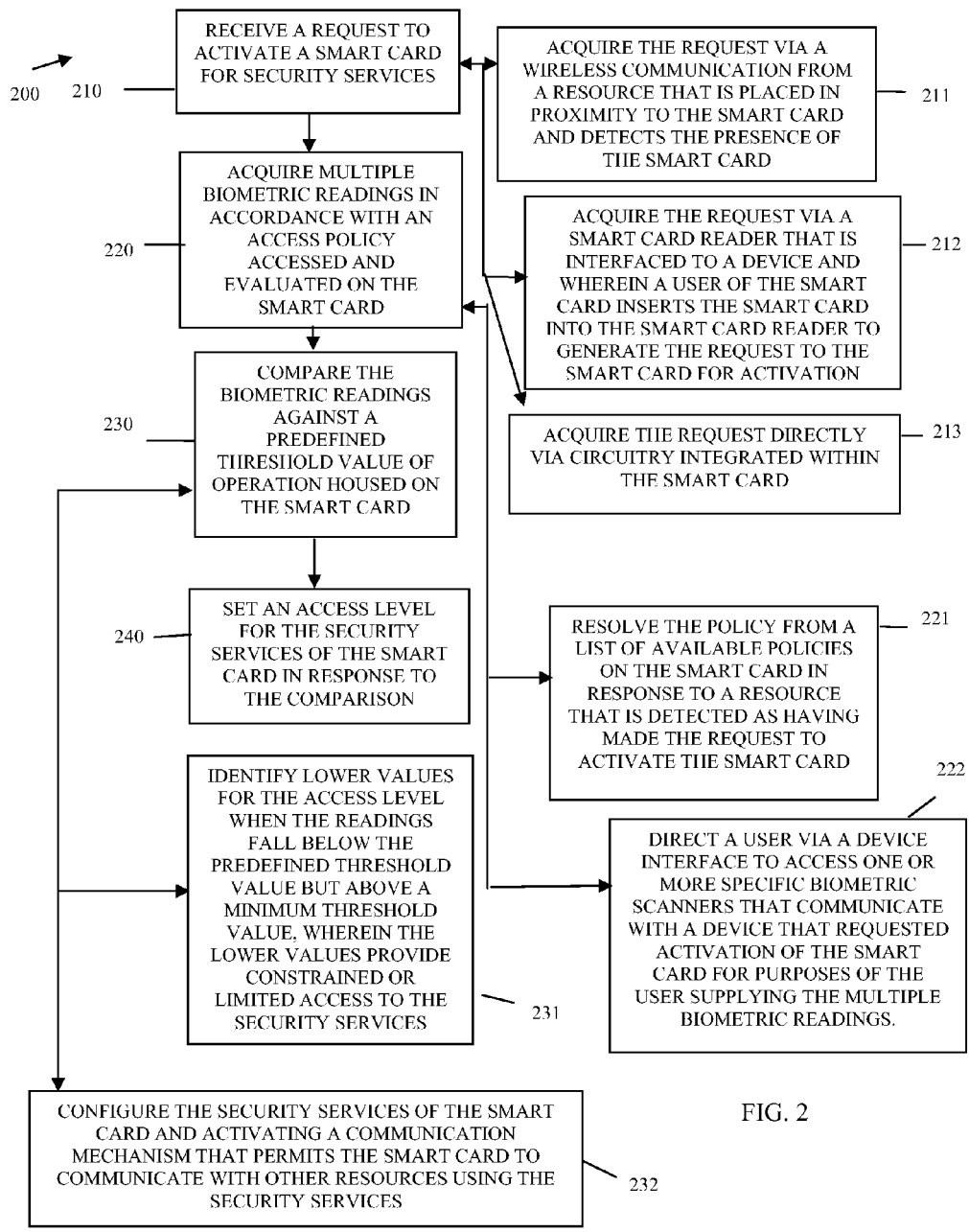
FIG. 2 is a diagram of another method for biometric smart card authentication, according to an example embodiment.

FIG. 2 is a diagram of another method 200 for biometric smart card authentication, according to an example embodiment. The method 200 (hereinafter "biometric authentication service") is implemented in a machine-accessible and readable medium. The biometric authentication service processes on and within a smart card and/or a smart card reader or scanner.

The biometric authentication service represents another aspect or in some cases enhanced perspective of the smart card authentication service represented by the method 100 of the FIG. 1.

At 210, the biometric authentication service receives a request to activate a smart card for security services included thereon. That is, the smart card permits a proper possessor of the smart card to authenticate to services, resources, and devices for access. The request can be received in a variety of manners.

For example, at 211, the biometric authentication service acquires the request via a wireless communication from a resource that is placed in proximity to the smart card and detects the presence of the smart card. As an example, consider a secure facility where doors to the facility are restricted based on security and door activators are wireless communication devices that detect the presence of smart cards on the persons of visitors or passersby. Once detected, the door activators send a wireless signal to the smart card in a form of the request that wakes up the biometric authentication service for processing. The smart card can be embedded on a badge of a user or included on or integrated into some clothing worn by the user or even integrated into another device possessed by the user.

In another situation, at 212, the biometric authentication service acquires the request via a smart card reader that is interfaced to a device. The user of the smart card inserts the smart card into the smart card reader to generate the request that activates the biometric authentication service on the smart card for processing. Here, a user can manually insert the smart card into a reader or scanner, such as a card swipe device, etc.

In still another case, at 213, the biometric authentication service acquires the request directly via circuitry integrated within the smart card. In this embodiment it may be that the biometric readers are integrated into the smart card.

At 220, the biometric authentication service acquires multiple biometric readings (measurements) in accordance with an access policy that is accessed and evaluated on the smart card.

In an embodiment, the biometric authentication service resolves the policy from a list of available policies present on the smart card. This is done in response to an identity associated with the resource that generated the request, which activated the biometric authentication service for processing on the smart card. So, the policy can be based on the type of resource that the user or possessor of the smart card is attempting to access. Thus, the smart card can include access mechanisms for multiple different resources associated with the user, each authentication required of the user defined via policies defined on the smart card that are specific to the resource being accessed by that user.

In an embodiment, at 222, the biometric authentication service directs the user via a device interface (to a device that the smart card is interfaced to) to access one or more specific biometric scanners that communicate with the device for purposes of supplying the multiple biometric readings or measurements of the requesting user. So, interface mechanisms can exist on the smart card and be known to the biometric authentication service, such that the biometric authentication service can interactively direct and communicate instructions to the requesting user via devices that the smart card is interfaced to. This is done to acquire the multiple biometric readings for further authentication to the resources of the smart card.

At 230, the biometric authentication service compares the multiple biometric readings against a predefined threshold value of operation housed on the smart card. So, the readings or measurements are compared against a predefined value or range of values to determine whether and to what extent authentication has been successful. In essence, the predefined threshold value is a tolerance or range of acceptable values for the readings.

In an embodiment, at 231, the biometric authentication service identifies lower values for the access level when the readings fall below the predefined threshold value but fall above a minimum threshold value. The lower values provide a constrained or limited access to the security services of the smart card. So, authentication does not have to be a binary proposition with embodiments of this invention; rather, different degrees of authentication are achievable each such degree can be defined via policy defined and evaluated on the smart card via the biometric authentication service.

In another situation, at 232, the biometric authentication service configures the security services of the smart card and activates a communication mechanism of the smart card, which permits the smart card to communicate with other resources that use the security services. So, here successful authentication of the biometric readings result in the biometric authentication service turning on or configuring communication ports, devices, and/or protocols that allow the smart card to actively authenticate the user to other resources, which expect these protocols, etc. In some cases, a wireless radio may be activated on the smart card once authentication is successful and the wireless radio permits the smart card to detect other devices in a wireless network and authenticate the user for access to those devices.

According to an embodiment, at 240, the biometric authentication service sets an access level for security services of the smart card in response to the comparison. Again, policy drives the degree to which the comparison is considered successful and can also be used to set access level for services on the smart card. In this way, a user can provide some biometric readings with lower confidence values than others to obtain limited authentication access to resources. This can be done for any number of reasons, such as when the user is under duress and being forced to authenticate to a resource or such as when the user is in the presence of another user and the requesting user wants just limited access.

Figure 3:
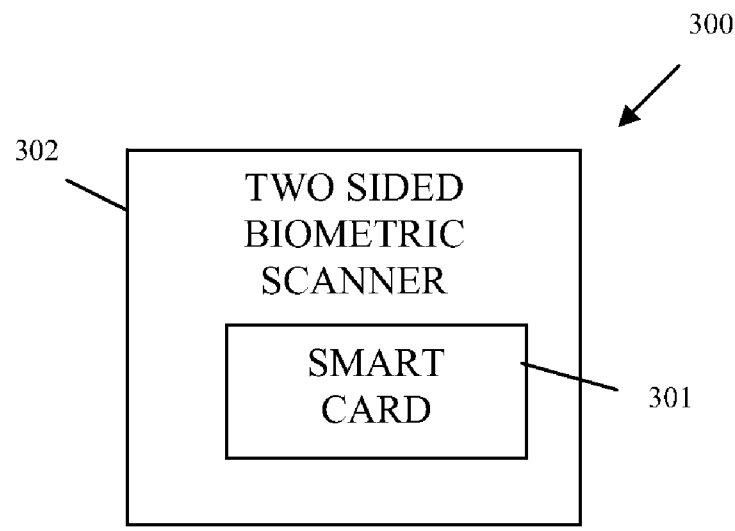
FIG. 3 is a diagram of biometric smart card authentication system, according to an example embodiment.

FIG. 3 is a diagram of biometric smart card authentication system 300, according to an example embodiment. The biometric smart card authentication system 300 is implemented in a machine-accessible and computer-readable storage medium as a portable and standalone processing device. In an embodiment, the biometric smart card authentication system 300 implements among other things the smart card authentication service represented by the method 100 of FIG. 1 and the biometric authentication service represented by the method 200 of the FIG. 2.

The biometric smart card authentication system 300 includes a smart card 301 and two-sided biometric scanner 302. Each of these will now be discussed in turn.

The smart card 301 is implemented in a portable device as instructions on a computer-readable storage medium of that portable device. Moreover, the portable device includes processor and memory enabled resources. Example processing associated with the instructions for security services of the smart card 301 was presented in detail above with reference to the methods 100 and 200 of the FIGS. 1 and 2, respectively.

The two-sided biometric scanner 302 is implemented in a different device from that which is associated with the smart card 301. However, the two-sided biometric scanner 302 encases and surrounds the smart card 301, such that the smart card 301 is completely inaccessible and hidden from view on an inside of the two-sided biometric scanner 302.

Essentially, the system 300 is an integrated and composite device comprising the smart card 301 for which access is controlled via the two-sided biometric scanner 302.

The two-sided biometric scanner 302 includes a first scanner on one side of the smart card 301 and a second scanner on an opposite side of the smart card 301. The first and second scanners cooperate to take two simultaneous biometric scans as biometric readings/measurements for two digits (two fingers or a finger and a thumb) of a user that desires to activate the smart card 301.

The smart card 301 validates the readings before granting the user access to security services that process on the smart card. The security services permit the user to authenticate to specific resources for purposes of accessing those resources. Before the user can use the security services, the user has to properly authenticate to the smart card 301 by supplying simultaneous (two digits—two fingers or a finger and a thumb) fingerprint readings via the two-sided biometric scanner 302 that surrounds the smart card 301.

According to an embodiment, the two-sided biometric scanner 302 includes a mechanical latch that hides a universal serial bus (USB) port, which is used for interfacing the smart card 301 to a machine (such as a computer). When the smart card 301 validates the multiple biometric readings supplied via the two-sided biometric scanner 302 from the requesting user, the smart card 301 sends instructions to activate the mechanical latch, which then opens to reveal the USB port.

In a related embodiment, the two-sided biometric scanner 302 includes a spring loaded release latch that expels the smart card 301 out of the two-sided scanner 302 that acts as a case for the smart card 301 when the smart card 301 validates the multiple biometric readings. So, a smart card 301 embedded in a credit card can be securely housed in the two-sided biometric scanner 302 container and only dislodged for use when the requesting user validates via multiple biometric readings for finger print scans. Should someone acquire the two-sided biometric scanner 302 and attempt to open it to acquire the smart card 301, the smart card 301 can detect such a condition and erase the contents of the smart card 301.

According to an embodiment, the smart card 301 activates a wireless communication driver within the smart card 301 when the smart card 301 successfully validates the readings.

Also, the smart card 301 can erases and removes the security services that process on the smart card 301 after a configurable number of invalid readings are successively provided to the smart card 301 via the two-sided biometric scanner 302.

In an embodiment, at least one of the scanners associated with the two-sided biometric scanner 301 also takes a different type of biometric reading (such as a heartbeat rate, etc.) from that which was associated with the finger print scan. The smart card 301 then compares that different type of biometric reading against a threshold range of operation value (e.g., 100 beats per minute, etc.) and is capable of overriding access and preventing access to the smart card 301 even when the biometric readings are initially validated. This can serve as an override feature for added security as was discussed at length above.

Figure 4:
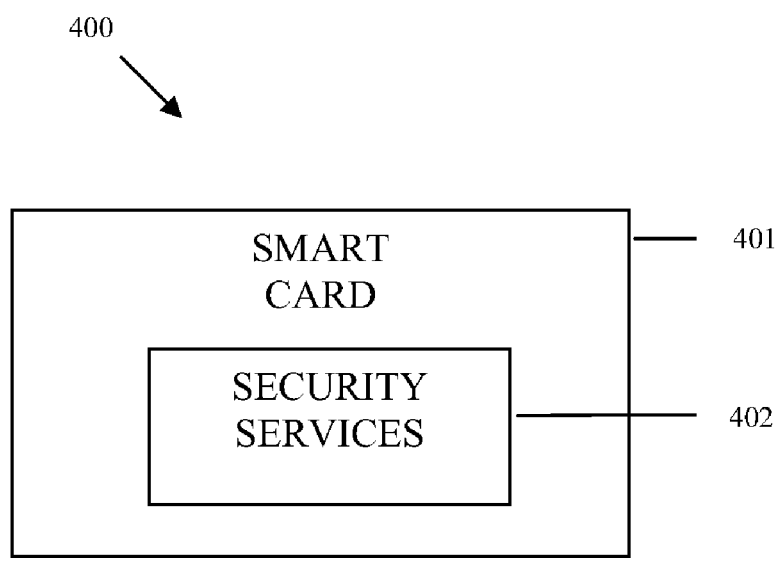
FIG. 4 is a diagram of another biometric smart card system, according to an example embodiment.

FIG. 4 is a diagram of another biometric smart card system 400, according to an example embodiment. The biometric smart card system 400 is implemented in a machine-accessible and computer-readable storage medium that has instructions that process via a processor and memory resources that reside on the biometric smart card system 400. So, the biometric smart card system 400 may be viewed as a standalone and portable device. In an embodiment, the biometric smart card system 400 performs, among other things, the processing associated with the method 100 of the FIG. 1; performs the processing associated with the method 200 of the FIG. 2; and presents another perspective and in some ways enhanced perspective to the system 300 of the FIG. 3.

The biometric smart card system 400 includes security services 401 and a smart card 402. Each of these will now be discussed in turn.

The security services 401 are implemented as are resources in a computer-readable storage medium as instructions that process on the smart card 402.

The smart card 402 is implemented as a standalone portable device having processor and memory resources in addition to the security services 401 that are also resources of the smart card 402.

The security services 401 are controlled by an authentication service that processes as a resource on the smart card 402 as well. The authentication service requires at least two biometric readings/measurements of a requesting user to perform initial authentication and to decide whether to activate some or all of the security services 401 on the smart card 402. Again, the security services 401 are controlled on the smart card 402.

According to an embodiment, at least two biometric readings are required to be simultaneously supplied together at the same time to the authentication service.

In another case, the authentication service configures access roles and security permissions in response to the authentication of the requesting user that occurs via the at least two biometric readings.

In a particular case, the at least two biometric readings include a finger print scan of the requesting user and another of the at least two biometric readings includes a thumb print scan of the requesting user.

In some situations, other biometric readings are obtained to influence and augment the processing of the authentication service when it decides whether to activate some or each of the security services 401 of the smart card 402 for the requesting user to access.

In an embodiment, the security services 401 lock down the smart card 402 and do not permit any additional access attempts to be made to access the smart card 402 when the requesting user fails to authenticate via the authentication service after a configured number of attempts, and wherein an authentication mechanism for accessing the smart card 402 is subsequent reset by administrative intervention defined by a particular security policy.

Example processing associated with the smart card 402 and the initial authentication service was presented in detail above with reference to the methods 100 and 200 of the FIGS. 1 and 2, respectively, and with reference to the system 300 of the FIG. 3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:

receiving, by a smart card, a request to activate the smart card for security services;

acquiring, by the smart card, multiple biometric readings in accordance with an access policy accessed and evaluated on the smart card, wherein the multiple biometric readings comprise a first biometric reading, a second biometric reading, and a third biometric reading, wherein the first biometric reading and the second biometric reading comprise fingerprints of a user of the smart card, wherein the third biometric reading comprises one or more of a skin temperature of the user of the smart card, a blood oxygen level for the user of the smart card, a heartbeat for the user of the smart card, a particular finger position of the user of the smart card when placed on a biometric scanner, a voice print for the user of the smart card, a facial scan of the user of the smart card, a retinal scan for one or more eyes of the user of the smart card, or a sample DNA analysis of the user of the smart card, and wherein the third biometric reading is selected based on the access policy stored on the smart card;

comparing, by the smart card, the biometric readings against threshold values predefined in the access policy stored on the smart card, wherein comparing further includes identifying lower values for the access level when the readings fall below the predefined threshold value but above a minimum threshold value, wherein the lower values provide more constrained or limited access to the security services than the minimum threshold value;

setting, by the smart card, an access level for the security services of the smart card based on the comparison; and erasing select information from the smart card when the user of the smart card unsuccessfully makes a predetermined number of attempts to gain access to the smart card.

2. The method of claim 1, wherein receiving further includes acquiring the request via a wireless communication from a resource that is placed in proximity to the smart card and detects the presence of the smart card.

3. The method of claim 1, wherein receiving further includes acquiring the request via a smart card reader that is interfaced to a device and wherein the user of the smart card of the smart card inserts the smart card into the smart card reader to generate the request to the smart card for activation.

4. The method of claim 1, wherein receiving further includes acquiring the request directly via circuitry integrated within the smart card.

5. The method of claim 1, wherein acquiring further includes resolving the policy from a list of available policies on the smart card in response to a resource that is detected as having made the request to activate the smart card.

6. The method of claim 1, wherein acquiring further includes directing the user of the smart card via a device interface to access one or more specific biometric scanners that communicate with the device that requested activation of the smart card for purposes of the user of the smart card supplying the multiple biometric readings.

7. The method of claim 1, wherein setting further includes configuring the security services of the smart card and activating a communication mechanism that permits the smart card to communicate with other resources using the security services.

8. A system comprising:

a processor; and a memory coupled with and readable by the processor and having stored therein a sequence of instructions which, when executed by the processor, cause the processor to implement a biometric authentication service by receiving a request to activate a smart card for security services, acquiring multiple biometric readings in accordance with an access policy accessed and evaluated on the smart card, wherein the multiple biometric readings comprise a first biometric reading, a second biometric reading, and a third biometric reading, wherein the first biometric reading and the second biometric reading comprise fingerprints of a user of the smart card, wherein the third biometric reading comprises one or more of a skin temperature of the user of the smart card, a blood oxygen level for the user of the smart card, a heartbeat for the user of the smart card, a particular finger position of the user of the smart card when placed on a biometric scanner, a voice print for the user of the smart card, a facial scan of the user of the smart card, a retinal scan for one or more eyes of the user of the smart card, or a sample DNA analysis of the user of the smart card, and wherein the third biometric reading is selected based on the access policy stored on the smart card, comparing the biometric readings against threshold values predefined in the access policy stored on the smart card, wherein comparing further includes identifying lower values for the access level when the readings fall below the predefined threshold value but above a minimum threshold value, wherein the lower values provide more constrained or limited access to the security services than the minimum threshold value, setting an access level for the security services of the smart card based on the comparison, and erasing select information from the smart card when the user of the smart card unsuccessfully makes a predetermined number of attempts to gain access to the smart card.

9. The system of claim 8, wherein receiving further includes acquiring the request via a wireless communication from a resource that is placed in proximity to the smart card and detects the presence of the smart card.

10. The system of claim 8, wherein receiving further includes acquiring the request via a smart card reader that is interfaced to a device and wherein the user of the smart card of the smart card inserts the smart card into the smart card reader to generate the request to the smart card for activation.

11. The system of claim 8, wherein receiving further includes acquiring the request directly via circuitry integrated within the smart card.

12. The system of claim 8, wherein acquiring further includes resolving the policy from a list of available policies on the smart card in response to a resource that is detected as having made the request to activate the smart card.

13. The system of claim 8, wherein acquiring further includes directing the user of the smart card via a device interface to access one or more specific biometric scanners that communicate with the device that requested activation of the smart card for purposes of the user of the smart card supplying the multiple biometric readings.

14. The system of claim 8, wherein setting further includes configuring the security services of the smart card and activating a communication mechanism that permits the smart card to communicate with other resources using the security services.

* * * * *

UNITED STATES PATENT AND TRADEMARK OFFICE
CERTIFICATE OF CORRECTION

PATENT NO. : 8,392,965 B2
APPLICATION NO. : 12/210960
DATED : March 5, 2013
INVENTOR(S) : Carter et al.

Page 1 of 1

It is certified that error appears in the above-identified patent and that said Letters Patent is hereby corrected as shown below:

In the Claims

In column 10, line 48, in Claim 3, before "inserts" delete "of the smart card".

In column 12, line 13, in Claim 10, before "inserts" delete "of the smart card".

Signed and Sealed this
Thirtieth Day of July, 2013

Teresa Stanek Rea
*Acting Director of the United States Patent and Trademark Office*